US011943115B2

(12) United States Patent
Zhang et al.

(10) Patent No.: US 11,943,115 B2
(45) Date of Patent: Mar. 26, 2024

(54) LOCALLY DEBUGGING REMOTE DEPLOYMENT OF MICROSERVICES

(71) Applicant: International Business Machines Corporation, Armonk, NY (US)

(72) Inventors: Guanqin Zhang, Beijing (CN); Lei Ren, Beijing (CN); Gui Ying Jin, Beijing (CN); Xiao Guang Luo, Beijing (CN); Yue Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/657,952

(22) Filed: Apr. 5, 2022

(65) Prior Publication Data

US 2023/0318925 A1    Oct. 5, 2023

(51) Int. Cl.
*H04L 41/122*     (2022.01)
*H04L 9/40*       (2022.01)
*H04L 41/342*     (2022.01)

(52) U.S. Cl.
CPC .......... *H04L 41/122* (2022.05); *H04L 41/342* (2022.05); *H04L 63/0272* (2013.01)

(58) Field of Classification Search
CPC .. H04L 41/122; H04L 41/342; H04L 63/0272
USPC ........................................................ 709/224
See application file for complete search history.

(56) References Cited

U.S. PATENT DOCUMENTS

| 9,201,759 | B2 * | 12/2015 | Wintergerst | ........ G06F 11/3664 |
| 10,268,566 | B2 * | 4/2019 | Merkle | ................ G06F 11/3664 |
| 2015/0007046 | A1 | 1/2015 | Branson | |
| 2015/0193328 | A1 * | 7/2015 | Deakin | ................. G06F 11/362 |
| | | | | 714/38.1 |
| 2018/0113680 | A1 * | 4/2018 | Browning | ........... H04L 12/4641 |
| 2018/0198845 | A1 * | 7/2018 | Kulp | ......................... G06F 9/54 |
| 2020/0112604 | A1 * | 4/2020 | Kulp | ..................... H04L 67/141 |
| 2020/0344112 | A1 * | 10/2020 | Reeve | .................. H04L 63/029 |
| 2022/0091830 | A1 * | 3/2022 | Ionescu | ..................... G06F 8/71 |

FOREIGN PATENT DOCUMENTS

| CN | 1664793 | A |   | 9/2005 | |
| CN | 105471695 | A |   | 4/2016 | |
| CN | 109150978 | A | * | 1/2019 | ........ H04L 63/0807 |
| CN | 111431956 | A |   | 7/2020 | |

(Continued)

OTHER PUBLICATIONS

"Developing and debugging services locally", Last modified May 30, 2020, 2 pages, <https://kubernetes.io/docs/tasks/debug-application-cluster/local-debugging/>.

(Continued)

*Primary Examiner* — Hee Soo Kim

(74) *Attorney, Agent, or Firm* — Stephanie L. Carusillo

(57) ABSTRACT

A computer-implemented method for local arrangement of remote deployment is provided according to embodiments of the present disclosure. In this method, a starting request to connect with a remote virtualization entity proxy can be received. A network tunnel can be initiated between a local system and the remote virtualization entity proxy. Then, at least one component in the remote virtualization entity proxy can be arranged into a local virtualization entity in the local system via the network tunnel.

19 Claims, 11 Drawing Sheets

(56) References Cited

FOREIGN PATENT DOCUMENTS

| CN | 111566619 A | | 8/2020 |
|---|---|---|---|
| CN | 114205342 A | * | 3/2022 |

OTHER PUBLICATIONS

"Run a Microservice Locally", Downloaded Sep. 23, 2021, 4 pages, <https://istio.io/latest/docs/examples/microservices-istio/single/>.

"Use Bridge to Kubernetes", Apr. 14, 2021, 10 pages, <https://docs.microsoft.com/en-us/visualstudio/bridge/bridge-to-kubernetes-vs-code>.

Greenfield et al., "Enabling Local Tunnel Debugging with the Kubernetes extension for VS Code", Jun. 2, 2021, 5 pages, <https://cloudblogs.microsoft.com/opensource/2021/06/02/enabling-local-tunnel-debugging-with-the-kubernetes-extension-for-vs-code/>.

Patel, Anand, "Weave + Docker for Mac: The bridge between local and remote services", Downloaded Sep. 23, 2021, 8 pages, <https://runnable.com/blog/weave-docker-for-mac-the-bridge-between-local>.

Mell et al., "The NIST Definition of Cloud Computing", Recommendations of the National Institute of Standards and Technology, NIST Special Publication 800-145, Sep. 2011, 7 pages.

International Searching Authority, "Notification of Transmittal of the International Search Report and the Written Opinion of the International Searching Authority, or the Declaration", Applicant's or agent's file reference PF221253PCT, International application No. PCT/CN2023/085923, International filing date Apr. 3, 2023, dated Jul. 5, 2023, 8 pages.

\* cited by examiner

LOCALLY DEBUGGING REMOTE DEPLOYMENT OF MICROSERVICES

BACKGROUND

The present invention relates to debug system, and more specifically, to arranging a remote deployment into a local system.

During an application development process, developers may spend a lot of time to debug application code. A debugging process may comprise code building, image building through pipelines, microservice deployment, printing logs, and/or the like.

A microservice technology is a method of developing applications as a suite of independently deployable, small, modular services in which each microservice runs a unique process and communicates through a well-defined, lightweight mechanism to serve a business goal. These microservices can be deployed, modified, and then redeployed independently without compromising the integrity of an application.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to one embodiment of the present invention, there is provided a computer-implemented method for local arrangement of remote deployment. In this method, a starting request to connect a local system with a remote virtualization entity proxy can be received. A network tunnel can be initiated between the local system and the remote virtualization entity proxy. Then, at least one component in the remote virtualization entity proxy can be arranged into a local virtualization entity in the local system via the network tunnel.

According to another embodiment of the present invention, there is provided an apparatus for local arrangement of remote deployment. The apparatus may comprise one or more processors, a memory coupled to at least one of the one or more processors, and a set of computer program instructions stored in the memory. The set of computer program instructions may be executed by at least one of one or more processors to perform the above method.

According to another embodiment of the present disclosure, there is provided a computer program product for local arrangement of remote deployment. The computer program product may comprise a computer readable storage medium having program instructions embodied therewith. The program instructions executable by one or more processors causes the processor to perform the above method.

In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
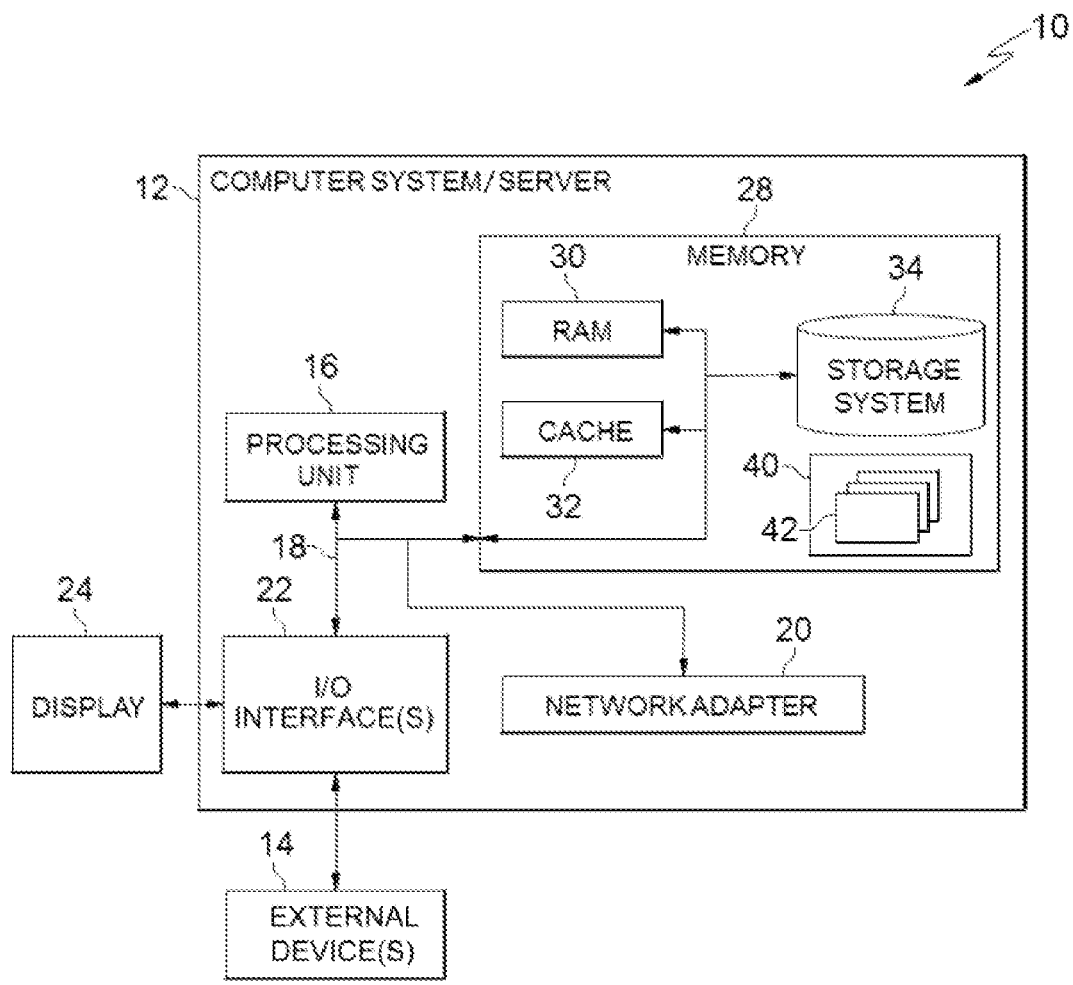
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
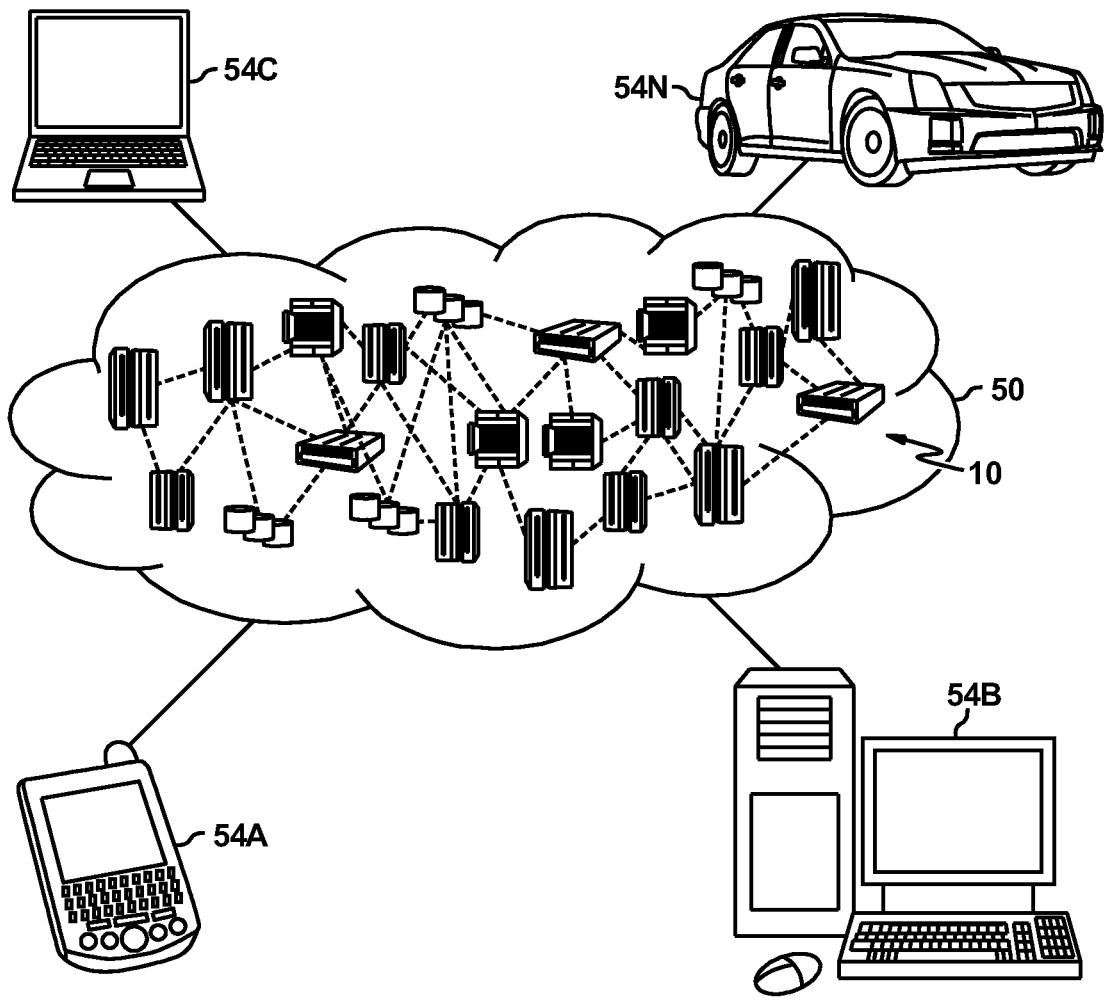
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
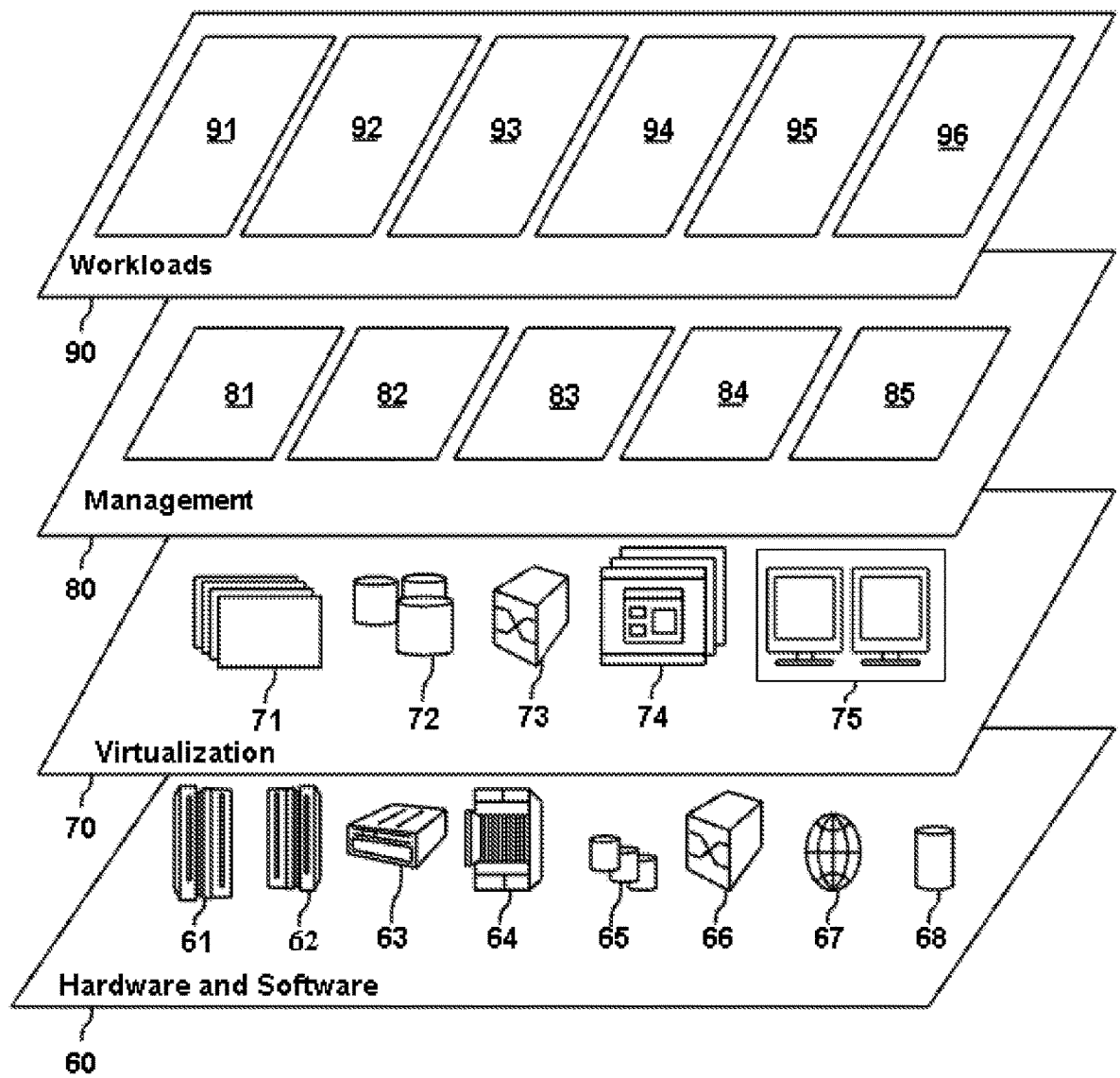
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and local arranging of a remote deployment 96.

Typically, a microservice can be deployed and then debugged based on a remote deployment, for example, in a remote virtualization entity in a cloud computing environment. The remote virtualization entity may be, for example, a Virtual machine, a Docker container, a cluster container, or the like. A cluster container may be described below with reference to FIG. 4 as an example remote virtualization entity.

Figure 4:
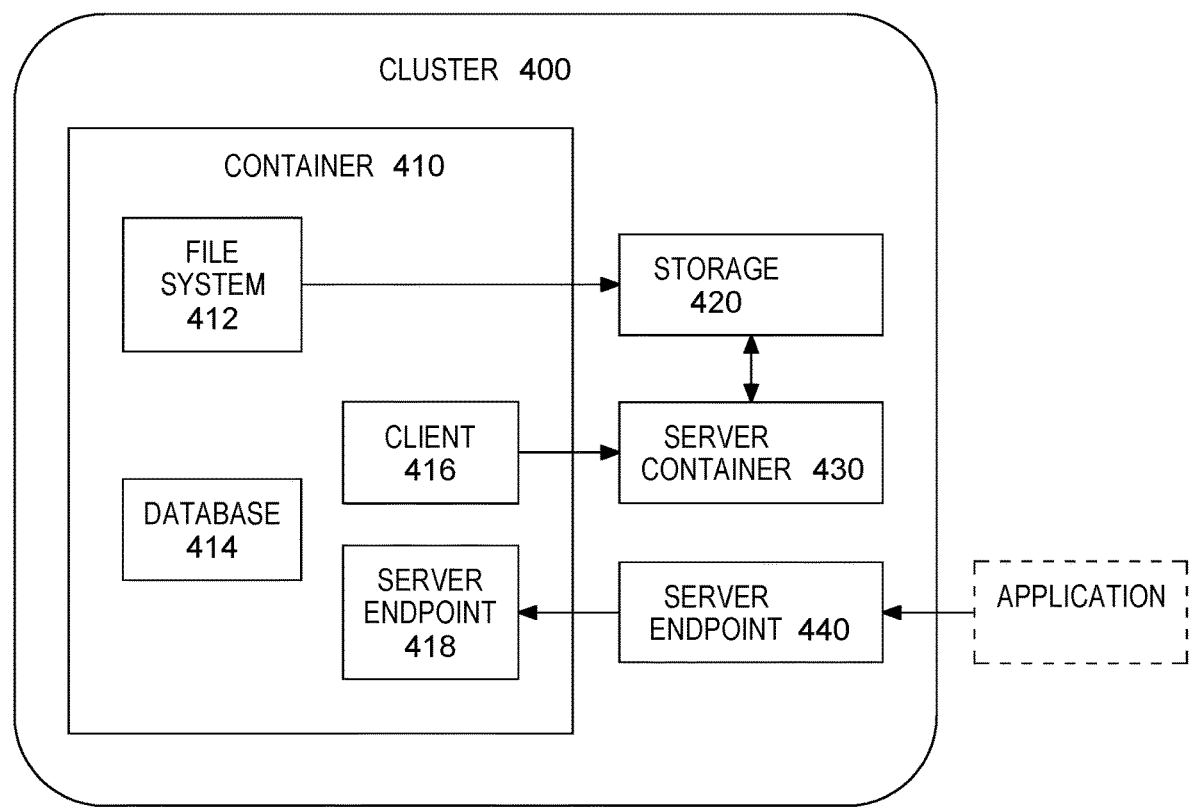
FIG. 4 depicts a block diagram showing a cluster according to some embodiments of the present invention.

FIG. 4 depicts a block diagram showing a cluster 400 for debugging microservices in a cloud computing environment according to some embodiments of the present disclosure.

In some embodiments, the cluster 400 may comprise a plurality of pods (not shown), each may run at least one container. A microservice may be deployed in the container. Generally, a microservice may have its own database and communicate with other microservices via an Application Programming Interface (API) gateway. Development and debugging of each microservice can be done separately.

For illustrative purpose only, a container 410 for debugging a microservice is shown and described according to the embodiments. Some other containers 430 specific to other microservices, related or unrelated to the microservice deployed in the container 410, may be arranged in the cluster 400 as needed.

As FIG. 4 shows, the container 410 may contain a file system 412, a database 414, a client 416, a server endpoint 418, and/or the like. The database 414 may store logs and data associated with the microservice. Accordingly, the file system 412 may read/write the logs and data associated with the microservice from/to the database 414.

Moreover, the cluster 400 may also contain a storage 420, a service endpoint 440, and/or the like. In the embodiments, the container 410 may access to the storage 420 and the other container 430, and may be accessed by an external application or microservice via the service endpoint 440.

In some embodiments, the file system 412 may retrieve contents from the storage 420, and may mount the logs and data from the database 414 to the storage 420. For example, the storage 420 may be implemented as a container, a network file system, or the like.

Moreover, the client 416 may access to a microservice deployed in the other container 430, such that the microservice deployed in the container 410 may call a function of the microservice deployed in the other container 430. For example, the client 416 may be a Representational State Transfer Application Programming Interface (REST API) client, a Graph Query Language (QL) client, a MongoDB client, or the like. Accordingly, the microservice deployed in the other container 430 may be a REST API microservice, a GraphQL microservice, a MongoDB, or the like. As an example, the REST API client may access to the REST API microservice in a same cluster. The GraphQL client may access to the GraphQL microservice. The MongoDB client may access to the MongoDB microservice.

In addition, the service endpoint 440 may be exposed, as an interface, to an external application or microservice. The service endpoint 440 may be an endpoint of a network proxy, for example, a Kubernetes (K8S) service. The external application or microservice may then access to the server endpoint 418 via the service endpoint 440. In such manner, a function of the microservice deployed in the container 410 may be called by other application or microservice.

It can be noted that, the cluster container may be created based on configuration files, such as, YAML configuration files. Specifically, the YAML configuration files may define the following items: apiVersion specifying a version from which K8S configuration meta will be fetched, kind specifying a type of K8S objects, and the like. The most common K8S objects are pods, replica sets, deployments, and services.

An exemplary YAML configuration file for creating a cluster container (for example, the container 410) may be provided below, in Table 1, as an Example 1.

TABLE 1 apiVersion: apps/410
kind: Deployment
metadata:
  name: Example 1
  labels:
    app: example
spec:
  replicas: 1
  selector:
    matchLabels:
      app: example
  template:
    metadata:
      labels:

TABLE 1-continued app: example
    spec:
      containers:
      ...
      - resources:
        limits:
          cpu: 4000m
          memory: 4096Mi
        requests:
          cpu: 2000m
          memory: 2048Mi
        name: example
        image: container:410

Therefore, the microservices may be deployed and debugged based on the created cluster in a cloud computing environment. However, deployment and debugging on cloud is a time-consuming process, as it may involve a complete deployment and debugging procedure, including code building, image building, image pushing and pulling, and pod restarting, and the like. Meanwhile, cloud resources are more expensive than local resources. For microservices using high CPU and memory, a debugging process with saved time and resources consumption is desired.

Figure 5:
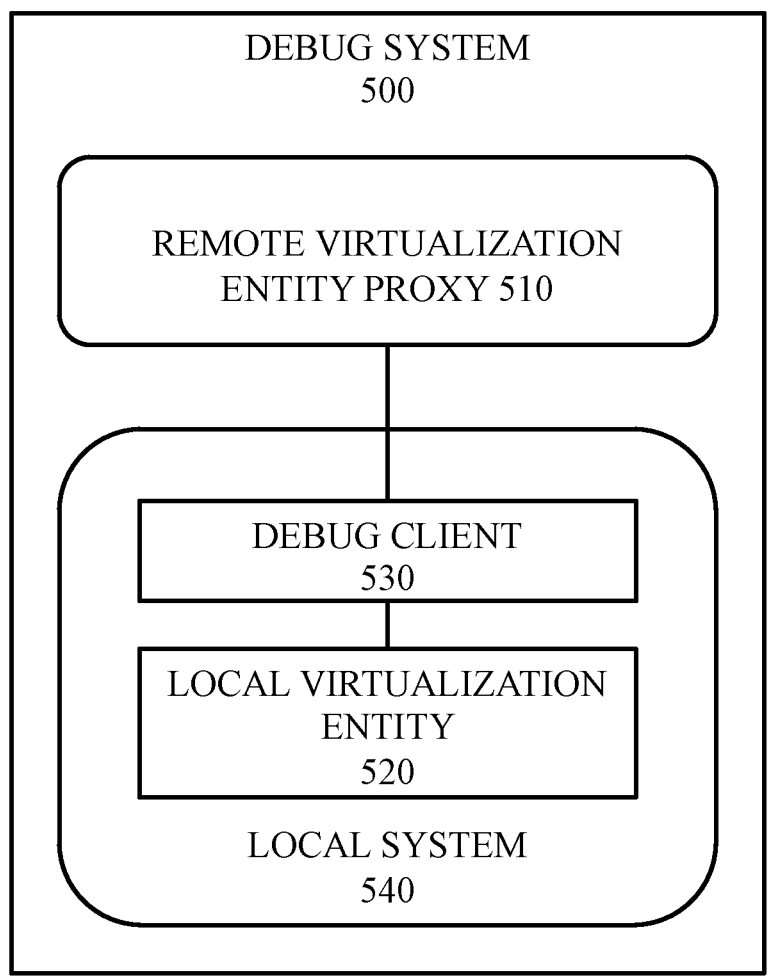
FIG. 5 depicts a block diagram showing a debug system according to some embodiments of the present invention.

Embodiments of the present disclosure provide a debug system which may arranging a remote deployment of a remote virtualization entity into a local system, such that a microservice debugging process can be implemented locally. FIG. 5 depicts a block diagram showing an example debug system 500 for debugging microservices locally according to some embodiments of the present disclosure. As shown in FIG. 5, the debug system 500 may comprise a remote virtualization entity proxy 510, a local virtualization entity 520, a debug client 530, and the like. The local virtualization entity 520 and the debug client 530 can be arranged in a local system 540.

In some embodiments, the remote virtualization entity proxy 510 and the local virtualization entity 520 may be created (and/or started) with respect to the remote virtualization entity. For example, the remote virtualization entity proxy 510 may have a same or a corresponding identification with the local virtualization entity 520, such that they may have a one-to-one correspondence to each other.

The remote virtualization entity proxy 510 may be implemented in a cloud computing environment, as a SAAS. The remote virtualization entity proxy 510 may be, such as, a Virtual machine, a Docker container, a cluster container, or the like. The local virtualization entity 520 may be implemented locally as a container. Similar with the cluster 400 in FIG. 4 as the remote virtualization entity, for example, the remote virtualization entity proxy 510 may be a remote cluster proxy. Moreover, the local virtualization entity 520 may be a local container.

Figure 6:
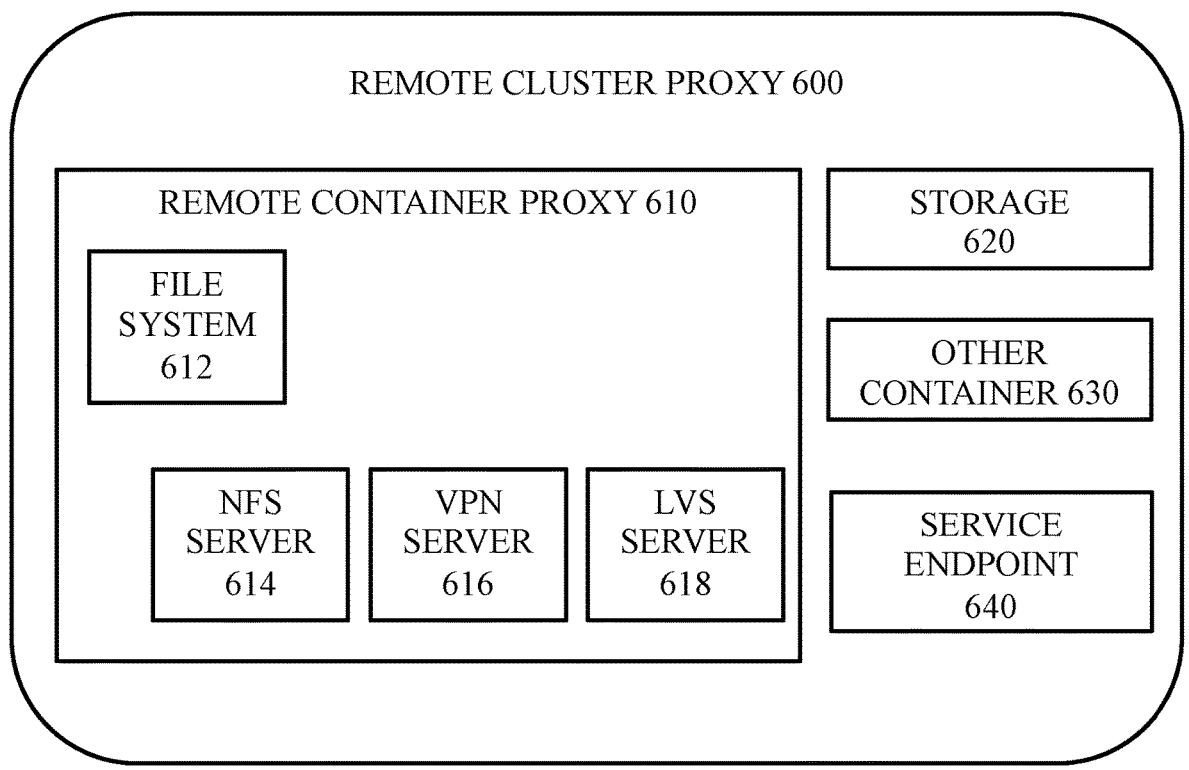
FIG. 6 depicts a block diagram showing a remote cluster proxy according to some embodiments of the present invention.
Figure 7:
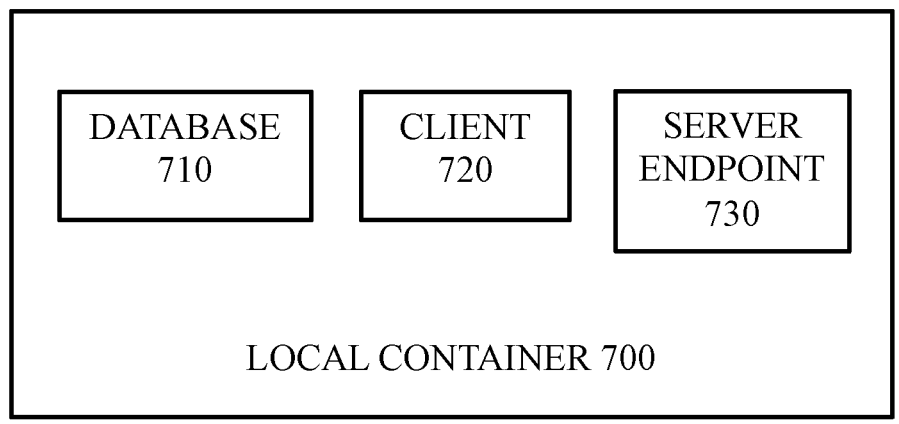
FIG. 7 depicts a block diagram showing a local container according to some embodiments of the present invention.

FIG. 6 depicts a block diagram showing a remote cluster proxy 600 according to some embodiments of the present disclosure. FIG. 7 depicts a block diagram showing a local container 700 according to some embodiments of the present disclosure. In some embodiments, the cluster proxy 600 and the local container 700 may be created (and/or started) with respect to the cluster 400 in FIG. 4.

As shown in FIG. 6, the remote cluster proxy 600 may contain a remote container proxy 610, a storage 620, other container 630, a service endpoint 640, and/or the like, in some embodiments. The remote container proxy 610 may comprise at least one component, for example, a file system 612 and one or more servers, such as a Network File System (NFS) server 614, a Virtual Private Network (VPN) server 616, a Linux Virtual Server (LVS) 618, and the like.

In some embodiments, the file system 612 may be configured as similar with the file system 412 in FIG. 4. Moreover, the storage 620, the other container 630, and the service endpoint 640 (such as, a K8S service) may respectively be configured as similar with the storage 420, the other container 430, and the service endpoint 440 in FIG. 4.

In some embodiments, the remote cluster proxy 600 may be deployed in a cloud computing environment. Moreover, the remote container proxy 610 may be provided as a SAAS.

On the other side, as shown in FIG. 7, the local container 700 may comprise a database 710, a client 720, a server endpoint 730, and/or the like. In addition to being arranged locally, the database 710, the client 720 and server endpoint 730 may respectively be configured as similar with the database 414, the client 416, and the server endpoint 418 in FIG. 4.

In some embodiments, the local container 700 may be deployed in a local system, for example, a computing device used by a developer. The local container 700 may be started with a start script based on configuration information associated with the local container 700. The configuration information may include a local directory, start parameters, identification of the local container 700, and/or the like. Moreover, the remote cluster proxy 600 and the local container 700 may be assigned with a same identification or corresponding identifications.

An exemplary YAML configuration file for creating a remote container proxy (for example, the remote container proxy 610) may be provided below, in Table 2, as an Example 2.

TABLE 2

```
apiVersion: apps/610
kind: Deployment
metadata:
    name: Example 2
    labels:
        app: example
spec:
    replicas: 1
    selector:
        matchLabels:
            app: example
    template:
        metadata:
            labels:
                app: example
        spec:
            containers:
            ...
            - resources:
                limits:
                    cpu: 400m
                    memory: 256Mi
                requests:
                    cpu: 100m
                    memory: 128Mi
                name: example
                image: remote container proxy:610
```

In the YAML configuration file of Example 2, a new image (remote container proxy: 610) is configured to replace the image (container: 410) in the YAML configuration file of Example 1. Therefore, as described above, the remote cluster proxy 600 may be created to further include the servers.

Moreover, compared with Example 1, limits and requests for resources (CPU and memory) may be lowered in Example 2, as the remote cluster proxy 600 may be an Input/output application. Otherwise, other configuration parameters, may be maintained the same.

Back to FIG. 5, in some embodiments, the debug client 530 may be configured to connect the remote virtualization entity proxy 510 and the local system 540, and thus the remote virtualization entity proxy 510 may be connected to the local virtualization entity 520. The debug client 530 may be further configured to arrange the remote deployment of the remote virtualization entity proxy 510 into the local virtualization entity 520 through tunneling technique. In this way, a microservice debugging process may be implemented in the local system 540.

For example, the microservice deployed in the container 410 in FIG. 4 may also be deployed in the debug system 500. Thus, the debugging of the microservice may be locally performed in the local virtualization entity 520 based on the remote deployment of the remote virtualization entity proxy 510.

In some embodiments, the debug client 530 may be installed in the local system 540 as a plugin.

Figure 8:
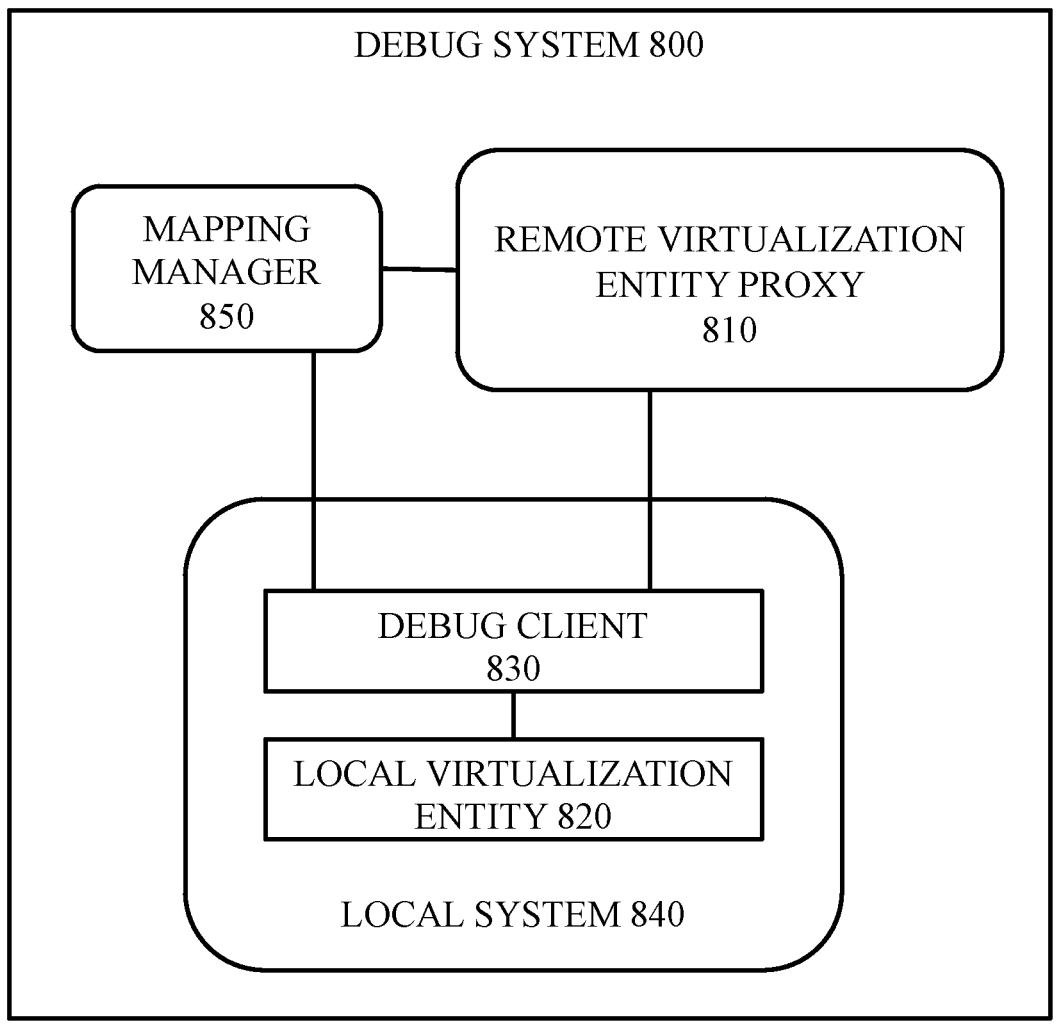
FIG. 8 depicts a block diagram showing a debug system according to some embodiments of the present invention.

According to further embodiments of the present disclosure, for secure connection of the remote virtualization entity proxy and the local virtualization entity, a debug system may be provided to further include a mapping manager. FIG. 8 depicts a block diagram showing a debug system 800 according to some embodiments of the present disclosure.

As shown in FIG. 8, the debug system 800 may comprise a remote virtualization entity proxy 810, a local virtualization entity 820 and a debug client 830 in a local system 840, a mapping manager 850, and the like. The remote virtualization entity proxy 810, the local virtualization entity 820, and the debug client 830 may be configured respectively as similar with the remote virtualization entity proxy 510, the local virtualization entity 520, and the debug client 530 in FIG. 5.

In some embodiments, the mapping manager 850 can be arranged to connect the remote virtualization entity proxy 810 with the debug client 830 in a secure manner. For example, the mapping manager 850 may be assigned with environment variables, for example, a key and an address of the mapping manager 850.

In such case, the remote virtualization entity proxy 810 (for example, the remote cluster proxy, including the remote container proxy) may be created further based on the environment variables associated with the mapping manager. Therefore, the remote virtualization entity proxy 810 may be linked to the mapping manager 850 based on the environment variables associated with the mapping manager 850.

An exemplary YAML configuration file for creating a remote container proxy based on the environment variables may be provided below, in Table 3, as an Example 3.

TABLE 3

```
apiVersion: apps/X
kind: Deployment
metadata:
    name: example-deployment
    labels:
        app: example
spec:
    replicas: 1
    selector:
        matchLabels:
            app: example
    template:
        metadata:
            labels:
```

TABLE 3-continued

```
    app: example
spec:
    containers:
    ...
    - resources:
        limits:
            cpu: 400m
            memory: 256Mi
        requests:
            cpu: 100m
            memory: 128Mi
      name: example
      image: remote container proxy: X
      env:
      - name: MAPPING_MANAGER_URL
        value: https://mapping.manager.com/manager
      - name: MAPPING_MANAGER_KEY
        value: a47db531b6b3879d854f46130d5e883
```

In some embodiments, a code modification plugin may be provided to modify a first configuration file (such as, Example 1) for creating a container to a second configuration file (such as, Example 2, Example 3) for creating a remote container proxy. For example, the code modification plugin may be installed in the local system to automatically transform the first configuration file to the second configuration file. In an alternative embodiment, the configuration file may also be manually modified by a developer to replace the image file, add the environment variables, and/or the like.

Compared with Example 2, the environment variables (MAPPING_MANAGER_URL and MAPPING_MANAGER_KEY) may be added in Example 3. The environment variables associated with the mapping manager 850 may also be retrieved by the debug client 830. Then, the debug client 830 may be registered with the mapping manager 850 based on the environment variables.

Accordingly, the remote virtualization entity proxy 810 may send, to the mapping manager 850, a request to connect to the debug client 830 based on the environment variables. The mapping manager 850 may then request the debug client 830 to connect with the remote virtualization entity proxy 810 based on the environment variables. In such way, the remote virtualization entity proxy 810 can be connected with the debug client 830 via the mapping manager 850, thereby improving security of the connection between them.

Moreover, in some embodiments, the mapping manager 850 can be arranged in a cloud computing environment, as a SAAS.

Embodiments of the present disclosure provide a method for arranging a remote deployment into a local system. Thus, a microservice debugging process running in a remote virtualization entity can be implemented locally. Embodiments will be described in detail below in conjunction with FIG. 9 and FIG. 10.

Figure 9:
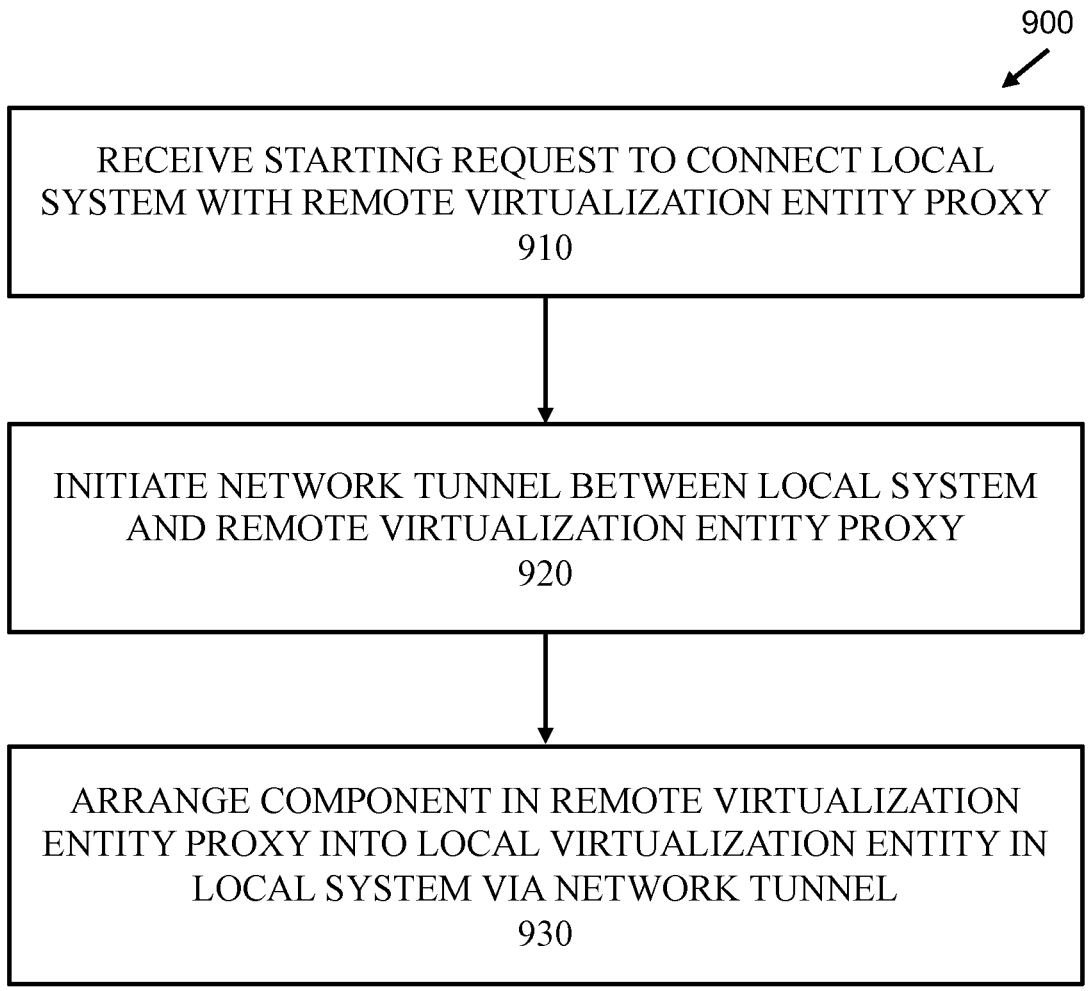
FIG. 9 depicts a schematic flowchart of a method for local arrangement of a remote deployment according to some embodiments of the present invention.

FIG. 9 depicts a schematic flowchart of a method 900 for local arrangement of remote deployment according to some embodiments of the present disclosure. In some embodiments, the method 900 can be implemented based on a debug system, for example, the debug system 500 in FIG. 5, the debug system 800 in FIG. 8, or the like.

In some embodiments, the processing of local arrangement of remote deployment according to the embodiments could be implemented by a debug client, for example, the computer system/server 12 of FIG. 1. The debug client, for example, the debug client 530 in FIG. 5, the debug client 830 in FIG. 8, or the like, may be arranged in a local system, for example, the local system 540 in FIG. 5, the local system 840 in FIG. 8, or the like.

Figure 10:
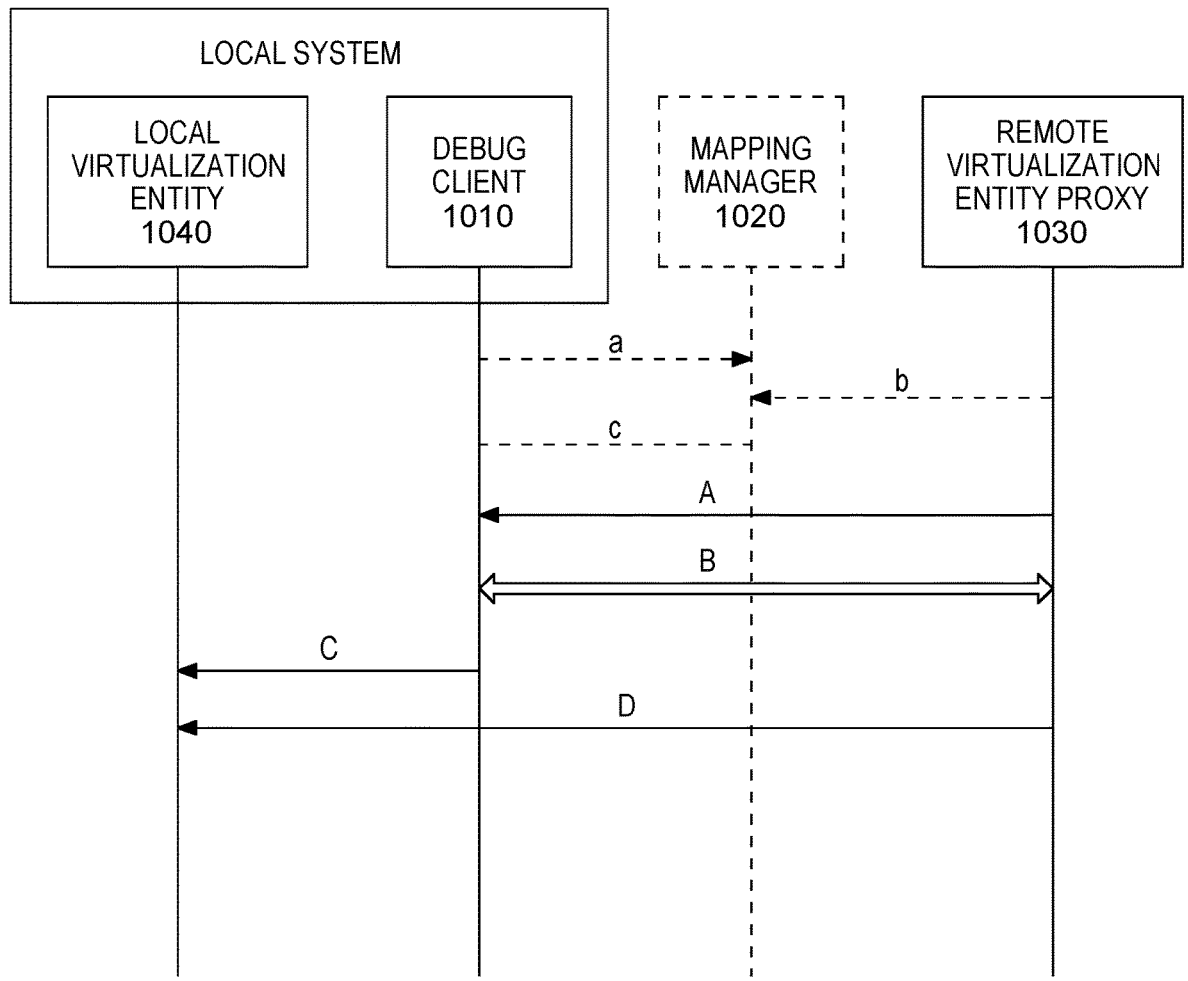
FIG. 10 depicts an illustrative flowchart of a process of local arrangement of a remote deployment according to some embodiments of the present invention.

FIG. 10 depicts an illustrative flowchart showing a process of local arrangement of a remote deployment based on a debug system (such as, the debug system 500, or the debug system 800) according to some embodiments of the present disclosure. In the debug system, a debug client 1010 (such as, the debug client 530 or 830) may be configured to perform the method 900 in FIG. 9. A remote virtualization entity proxy 1030 (such as, the remote virtualization entity proxy 510 or 810) and a local virtualization entity 1040 (such as, the local virtualization entity 520 or 820) may be created for implementing the function of the remote virtualization entity (such as, cluster 400) described above. The debug client 1010 and the local virtualization entity 1040 may be provided in a local system.

As shown in FIG. 9, at block 910, the debug client receives a starting request to connect a local system with a remote virtualization entity proxy.

In some embodiments, the remote virtualization entity proxy 1030 may send the starting request to the debug client 1010 directly at stage A. Correspondingly, the debug client 1010 may receive the starting request from the remote virtualization entity proxy 1030.

In some other embodiments, for the debug system with the mapping manager 1020 (such as, the mapping manager 850), stages a, b, and c can be performed instead of stage A. The mapping manager 1020 may be assigned with environment variables, such as a key, an address, and/or the like. In some embodiments, in a preparation stage, for example, before stage a, the debug client 1010 may retrieve the environment variables associated with the mapping manager 1020, and may register itself with the mapping manager 1020 based on the environment variables. Moreover, the remote virtualization entity proxy 1030 may be assigned with the environment variables.

At stage a, the debug client 1010 may listen to the mapping manager 1020 for the starting request. At stage b, the remote virtualization entity proxy 1030 may request the mapping manager 1020 based on the environment variables to connect to the debug client 1010. In response to the request, the mapping manager 1020 may be linked to the remote virtualization entity proxy 1030, and may send the starting request to the debug client 1010 at stage c. Accordingly, the debug client 1010 may receive the starting request from the mapping manager 1020. Therefore, the debug client 1010 may be connected to the remote virtualization entity proxy 1030 via the mapping manager 1020 in a secure manner.

At block 920, the debug client initiates a network tunnel between the local system and the remote virtualization entity proxy, for example, in response to the starting request. The network tunnel may be configured for data forwarding between a port of the local system and a port of the remote virtualization entity proxy.

In some embodiments, as shown in FIG. 10, the network tunnel can be initiated to be established between the remote virtualization entity proxy 1030 and the debug client 1010 which is included in the local system at stage B. For example, the network tunnel may comprise a port forwarding for at least one component in the remote virtualization entity proxy. In some embodiments, the remote virtualization entity proxy may be provided with a Network File System (NFS) server, a Virtual Private Network (VPN) server, and/or the like. Thus, the network tunnel may comprise, for example, a first port forwarding for a Network File System server, a second port forwarding for a Virtual Private Network (VPN) server, and/or the like.

At block 930, the debug client arranges at least one component in the remote virtualization entity proxy into a local virtualization entity in the local system via the network tunnel.

In some embodiments, the debug client 1010 may start the local virtualization entity 1040 at stage C, as shown in FIG. 10. For example, the debug client 1010 may run a start script based on configuration information associated with the local virtualization entity 1040. The configuration information may include a local directory, start parameters, identification of the local virtualization entity, and/or the like. The identification may be the same as or correspond to an identification of the remote virtualization entity proxy 1030. After the local virtualization entity 1040 started, it can be securely connected with the remote virtualization entity proxy 1030 via the network tunnel.

Then, at stage D, the debug client 1010 may map the at least one component (as the remote deployment) of the remote virtualization entity proxy 1030 into the local virtualization entity 1040 via the port forwarding.

For example, the at least one component may comprise a file system. In some embodiments, the debug client 1010 may map the file system into the local virtualization entity 1040 via the first port forwarding for the NFS server. Then, the local virtualization entity 1040 may share the file system with the remote virtualization entity proxy.

Moreover, for example, the at least one component may comprise the VPN server. In some embodiments, the debug client 1010 may map the VPN server into the local virtualization entity 1040 via the second port forwarding for the VPN server, to form a VPN client in the local virtualization entity 1040. Therefore, a VPN network can be formed based on the VPN server and the VPN client. In this case, a client in the local virtualization entity may access to a remote microservice via the VPN client and the VPN server, i.e., via the VPN network.

In a further embodiment, a Linux Virtual Server (LVS) may also be included in the remote virtualization entity proxy 1030. In some embodiments, a server endpoint in the local virtualization entity may be accessible by an external application via the LVS and the VPN client.

In an alternative embodiment, stage D can be implemented before stage C in FIG. 10. Specifically, after the network tunnel is initiated at stage B, the debug client 1010 may map the at least one component into the local system firstly at stage D. The debug client 1010 may then start the local virtualization entity 1040 in the local system at stage C, for example, by means of the above described manner. In embodiments, the started local virtualization entity 1040 has a same or corresponding identification with the remote virtualization entity proxy 1030. Further, the debug client 1010 may cause the local virtualization entity 1040 to include the at least one component.

It can be noted that, the sequence of the stages described in the embodiments are merely for illustrative purposes. Any other appropriate sequences (including addition, deletion, and/or modification of at least one stage) can also be implemented to realize the corresponding embodiments.

Figure 11:
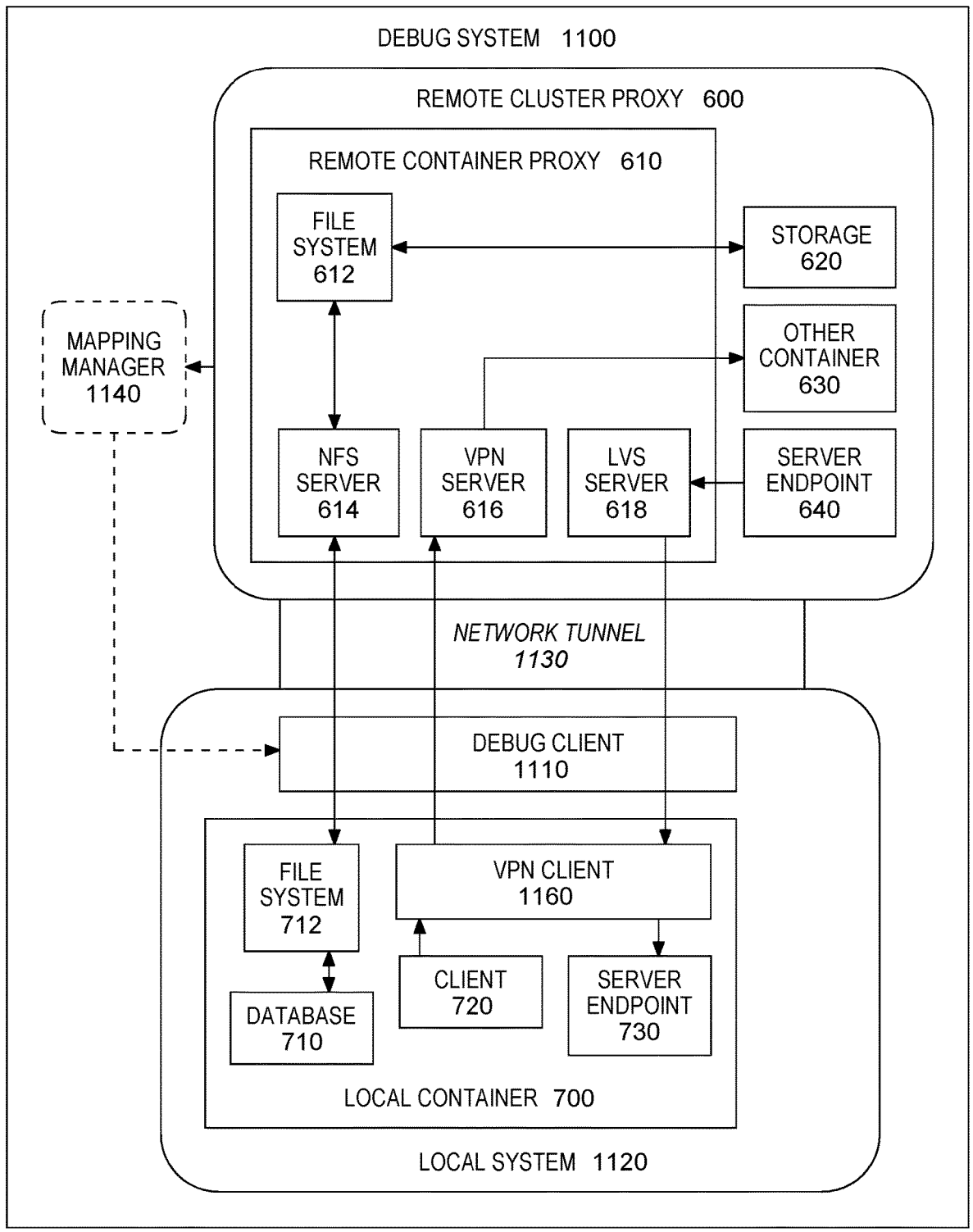
FIG. 11 depicts a block diagram showing a debug system according to some embodiments of the present invention.

FIG. 11 depicts a schematic block diagram of a debug system 1100 using the method of local arrangement of remote deployment in FIG. 9 according to some embodiments of the present disclosure. In the embodiments, the debug system 1100 may be implemented as the debug system 500 or the debug system 800.

In some embodiments, as shown in FIG. 11, the debug system 1100 may comprise a debug client 1110 (for example, the debug client 530, 830), the local container 700 (as shown in FIG. 7), and the remote cluster proxy 600 (as shown in FIG. 6). The debug client 1110 and the local container 700 may be provided in a local system 1120 (for example, the local system 540, 840). The remote cluster proxy 600 may be provided in a cloud computing environment as a SAAS.

As described above, the remote cluster proxy 600 and the local container 700 may be created (and/or started) with respect to the cluster 400. Thus, the debugging process for the microservice deployed in the container 410 in the cluster 400 can be equivalently implemented by the debug system 1100 according to embodiments of the present disclosure.

In some embodiments, the remote cluster proxy 600 may be connected with the debug client 1110 by means of any appropriate connection technique.

Additionally, the debug system 1100 may further comprise a mapping manager 1140 (for example, the mapping manager 850), as dotted block shows.

In some embodiments, the debug client 1110 may retrieve environment variables associated with the mapping manager 1140, for example, a key and an address of the mapping manager 1140. The debug client 1110 may be registered with the mapping manager 1140 based on the environment variables. For example, a user interface, such as an interface of a browser console, may be provided for the registering process. The debug client 1110 may then listen to the mapping manager 1140 for a starting request.

The remote cluster proxy 600 may be created with the environment variables. The remote cluster proxy 600 may be linked to the mapping manager 1140 based on the environment variables. In response to a request connecting with the debug client 1110 from the remote cluster proxy 600, the mapping manager 1140 may send the starting request to the corresponding debug client 1110 based on the environment variables. Respectively, the debug client 1110 may receive the starting request and connect to the remote cluster proxy 600 in a secure manner.

Upon the secure connection, the debug client 1110 may initiate a network tunnel 1130 between the remote cluster proxy 600 and the local system 1120. The network tunnel 1130 can be configured for data forwarding between a port of the remote cluster proxy 600 and a port of the local system 1120. For example, the network tunnel 1130 may comprise the first port forwarding for the NFS server 614, a second port forwarding for the VPN server 616, and/or the like.

The debug client 1110 may start the local container 700 corresponding to the remote cluster proxy 600 based on configuration information. The configuration information may include a local directory, start parameters, identification, and/or the like. Accordingly, the remote cluster proxy 600 may be connected to the local container 700 by means of the network tunnel 1130.

In some embodiments, the debug client 1110 may map the file system 612 from the remote container proxy 610 into the local container 700 via the first port forwarding, as a shared file system 712. That is, the file system 612/712 can be shared between the remote container proxy 610 and the local container 700. The file shared system 712 may read/write logs and data from/to the database 710. Moreover, the shared file system 712 may retrieve contents from the storage 620 in the remote cluster proxy 600, and mount the logs and data to the storage 620. As an example, a data processing related microservice can be debugged in the local system 1120 based on the shared file system 712.

In some embodiments, the debug client 1110 may map the VPN server 616 from the remote container proxy 610 into the local container 700 via the second port forwarding, to form a VPN client 1160 in the local container 700. A VPN network may be established based on the VPN server 616 and the VPN client 1160.

Alternatively, the above mapping process and the local container starting process can be implemented in another order. For example, the debug client may map a component (such as, the file system 612, the VPN server 616, or the like) from the remote cluster proxy 600 into the local container 700, and then start the local container 700 to include the component.

In some embodiment, the client 720 may access to the other container 630 in the remote cluster proxy 600 or external application via the VPN network. Some other microservices (or applications) may be deployed in the other container 630. For example, the client 720 may be a REST API client, a GraphQL client, a MongoDB client, or the like. Accordingly, the microservice deployed in the other container 630 may be a REST API microservice, a GraphQL microservice, a MongoDB microservice, or the like. As an example, the REST API client in the local container 700 may access the REST API microservice in the remote cluster proxy 600 through the VPN network. Therefore, the microservice to be debugged may call functions of other microservices or applications.

Further, the service endpoint 640 (such as, a K8S service) can be exposed to an external application, such that the external application may access the server endpoint 730 via the K8S service, the LVS server 618 and the VPN client 1160. That is, an access to the server endpoint 418 in cluster 400 in FIG. 4 can be redirect to the server endpoint 730 in the local container 700 through the LVS server and the VPN client. Therefore, the microservice to be debugged may provide a calling interface for other microservices or applications, which may then call functions of the microservice via the calling interface.

Therefore, the debug system 1100 may debug microservices by running corresponding code instantly in local. The developers may run, compile and modify microservice code with compiling tools at any time. Moreover, time cost for image building, image pushing, and pod restarting may be respectively saved. Thus, the local debugging process according to the embodiments may save both developers' time and cloud resources, and becomes more convenient than running on cloud.

Additionally, in some embodiments of the present disclosure, an apparatus for local arrangement of a remote deployment may be provided. The apparatus may comprise one or more processors, a memory coupled to at least one of the one or more processors, and a set of computer program instructions stored in the memory. The set of computer program instructions may be executed by at least one of one or more processors to perform the above method.

In some other embodiments of the present disclosure, a computer program product for local arrangement of a remote deployment may be provided. The computer program product may comprise a computer readable storage medium having program instructions embodied therewith. The program instructions executable by one or more processors causes the processor to perform the above method.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by one or more processing units of a debug client from a remote virtualization entity proxy, a starting request to connect a local system with the remote virtualization entity proxy;
   initiating, by one or more processing units of the debug client, a network tunnel between the local system and the remote virtualization entity proxy in response to the starting request;
   starting, by one or more processing units of the debug client, a local virtualization entity corresponding to the remote virtualization entity proxy;
   mapping, by one or more processing units of the debug client, at least one component in the remote virtualization entity proxy as a remote deployment into the local virtualization entity in the local system as a shared component via the network tunnel; and
   arranging, by one or more processing units of the debug client, the remote deployment of the at least one component in the remote virtualization entity proxy into the local virtualization entity in the local system via the network tunnel such that a microservice debugging process is implemented locally.

2. The method according to claim 1, wherein the network tunnel comprises a port forwarding for at least one component in the remote virtualization entity proxy, and wherein arranging the remote deployment of the at least one component in the remote virtualization entity proxy into the local virtualization entity in the local system via the network tunnel such that the microservice debugging process is implemented locally comprises:
   mapping, by one or more processing units, the at least one component into the local virtualization entity via the port forwarding.

3. The method according to claim 2, wherein the port forwarding comprises a first port forwarding for a Network File System server in the remote virtualization entity proxy, and wherein arranging the at least one component in the remote virtualization entity proxy into the local virtualization entity in the local system via the network tunnel comprises:
   mapping, by one or more processing units, a file system in the remote virtualization entity proxy into the local virtualization entity via the first port forwarding.

4. The method according to claim 2, wherein the port forwarding comprises a second port forwarding for a Virtual Private Network (VPN) server in the remote virtualization entity proxy, and wherein arranging the remote deployment of the at least one component in the remote virtualization entity proxy into the local virtualization entity in the local system via the network tunnel such that the microservice debugging process is implemented locally comprises:
   mapping, by one or more processing units, the VPN server into the local virtualization entity via the second port forwarding, to form a VPN client in the local virtualization entity.

5. The method according to claim 4, wherein a client in the local virtualization entity accesses to a remote microservice via the VPN client and the VPN server.

6. The method according to claim 4, wherein a server endpoint in the local virtualization entity is accessible by an external application via a Linux Virtual Server in the remote virtualization entity proxy and the VPN client.

7. The method according to claim 1, wherein starting the local virtualization entity corresponding to the remote virtualization entity proxy further comprises:
running, by one or more processing units, a start script based on configuration information associated with the local virtualization entity, to start the local virtualization entity.

8. The method according to claim 1, wherein arranging the remote deployment of the at least one component in the remote virtualization entity proxy into the local virtualization entity in the local system via the network tunnel such that the microservice debugging process is implemented locally comprises:
causing, by one or more processing units, the local virtualization entity to include the mapped at least one component.

9. The method according to claim 1, further comprising:
retrieving, by one or more processing units, environment variables associated with a mapping manager;
registering, by one or more processing units, with the mapping manager based on environment variables.

10. The method according to claim 9, wherein the environment variables comprise a key and an address of the mapping manager.

11. The method according to claim 9, wherein the remote virtualization entity proxy is linked to the mapping manager based on the environment variables, and wherein receiving the starting request to connect the local system with the remote virtualization entity proxy comprises:
listening, by one or more processing units, to the mapping manager for the starting request;
receiving, by one or more processing units, the starting request from the mapping manager.

12. An apparatus, comprising:
one or more processors;
a memory coupled to at least one of the one or more processors; and
a set of computer program instructions stored in the memory and executed by at least one of the one or more processors of a debug unit in order to perform actions of:
receiving, by a debug client from a remote virtualization entity proxy, a starting request to connect a local system with the remote virtualization entity proxy;
initiating a network tunnel between the local system and the remote virtualization entity proxy in response to the starting request;
starting a local virtualization entity corresponding to the remote virtualization entity proxy;
mapping at least one component in the remote virtualization entity proxy as a remote deployment into the local virtualization entity in the local system as a shared component via the network tunnel; and
arranging the remote deployment of the at least one component in the remote virtualization entity proxy into the local virtualization entity in the local system via the network tunnel such that a microservice debugging process is implemented locally.

13. The apparatus of claim 12, wherein the network tunnel comprises a port forwarding for at least one component in the remote virtualization entity proxy, and wherein arranging the remote deployment of the at least one component in the remote virtualization entity proxy into the local virtualization entity in the local system via the network tunnel such that a microservice debugging process is implemented locally comprises:
mapping the at least one component into the local virtualization entity via the port forwarding.

14. The apparatus of claim 13, wherein the port forwarding comprises a first port forwarding for a Network File System server in the remote virtualization entity proxy, and wherein arranging the remote deployment of the at least one component in the remote virtualization entity proxy into the local virtualization entity in the local system via the network tunnel such that a microservice debugging process is implemented locally comprises:
mapping a file system in the remote virtualization entity proxy into the local virtualization entity via the first port forwarding.

15. The apparatus of claim 13, wherein the port forwarding comprises a second port forwarding for a Virtual Private Network (VPN) server in the remote virtualization entity proxy, and wherein arranging the remote deployment of the at least one component in the remote virtualization entity proxy into the local virtualization entity in the local system via the network tunnel such that a microservice debugging process is implemented locally comprises:
mapping the VPN server into the local virtualization entity via the second port forwarding, to form a VPN client in the local virtualization entity.

16. The apparatus of claim 13, the actions further comprise:
retrieving environment variables associated with a mapping manager; and
registering with the mapping manager based on environment variables.

17. A computer program product, comprising a computer readable storage medium having program instructions embodied therewith, the program instructions executable by a one or more processors of a debug unit to cause the one or more processors to perform actions of:
receiving, by a debug client from a remote virtualization entity proxy, a starting request to connect a local system with the remote virtualization entity proxy;
initiating a network tunnel between the local system and the remote virtualization entity proxy in response to the starting request;
starting a local virtualization entity corresponding to the remote virtualization entity proxy;
mapping at least one component in the remote virtualization entity proxy as a remote deployment into the local virtualization entity in the local system as a shared component via the network tunnel; and
arranging the remote deployment of the at least one component in the remote virtualization entity proxy into the local virtualization entity in the local system via the network tunnel such that a microservice debugging process is implemented locally.

18. The computer program product of claim 17, wherein the network tunnel comprises a first port forwarding for a Network File System server in the remote virtualization entity proxy, and wherein arranging the remote deployment of the at least one component in the remote virtualization entity proxy into the local virtualization entity in the local system via the network tunnel such that a microservice debugging process is implemented locally comprises:
mapping a file system in the remote virtualization entity proxy into the local virtualization entity via the first port forwarding.

19. The computer program product of claim 17, wherein the network tunnel comprises a second port forwarding for a Virtual Private Network (VPN) server in the remote virtualization entity proxy, and wherein arranging the remote deployment of the at least one component in the remote virtualization entity proxy into the local virtualization entity in the local system via the network tunnel such that a microservice debugging process is implemented locally comprises:

mapping the VPN server into the local virtualization entity via the second port forwarding, to form a VPN client in the local virtualization entity.

* * * * *